(12) United States Patent
Ford

(10) Patent No.: US 6,305,318 B1
(45) Date of Patent: Oct. 23, 2001

(54) HUMAN SHAPED PET BED

(76) Inventor: Janet J. Ford, 3108 Finch St., Davis, CA (US) 95616

( * ) Notice: Subject to any disclaimer, the term of this patent is extended or adjusted under 35 U.S.C. 154(b) by 0 days.

(21) Appl. No.: 09/547,148

(22) Filed: Apr. 11, 2000

(51) Int. Cl.[7] .................................................. A01K 29/00
(52) U.S. Cl. ...................... 119/28.5; D30/118; D30/108; 5/636; D6/601
(58) Field of Search .................................. 119/28.5, 497, 119/484, 491, 498, 482; D30/118, 108; D6/601; 5/636, 419, 490

(56) References Cited

U.S. PATENT DOCUMENTS

| | | | |
|---|---|---|---|
| D. 427,731 | * 7/2000 | Copple | D30/118 |
| D. 431,694 | * 10/2000 | Copple | D30/118 |
| D. 432,739 | * 10/2000 | Aloisi | D30/118 |
| D. 441,146 | * 4/2001 | Passmore | D30/118 |
| 5,437,070 | * 8/1995 | Rempp | 5/636 |
| 5,509,157 | * 4/1996 | Story | 5/640 |
| 6,055,687 | * 5/2000 | Matthews | 5/636 |
| 6,196,156 | * 3/2001 | Denesuk et al. | 119/28.5 |
| 6,216,298 | * 4/2001 | Oliveira | 5/636 |

\* cited by examiner

*Primary Examiner*—Michael J. Carone
*Assistant Examiner*—Judith A. Nelson
(74) *Attorney, Agent, or Firm*—William S. Bernheim

(57) ABSTRACT

A pet bed comprising of a washable outer covering of the shape and texture of a pair of human shorts having disposed within a removable anatomical cushion, and a removable, scented pouch disposed within the outer covering.

9 Claims, 2 Drawing Sheets

HUMAN SHAPED PET BED

BACKGROUND OF THE INVENTION

1. Field of Invention

This invention relates generally to a pet bed, primarily for cats and dogs, in the shape of a human lap with a removable, washable sleeping surface and removable scented pouch.

2. Relevant Prior Art

Animals by nature like to rest in an environment of comfort, security, and familiarity. Cats and small dogs, in particular, like to rest on their owner's lap. In addition to being soft for comfort, the three-dimensional contour of the owner's lap cradles the animal adding a sense of security.

Because of owner time constraints for household duties and activities outside the home, the amount of time/day that an owner allows an animal to rest in their lap is limited. Animals then typically seek comfort in areas they are most familiar, often on household furniture such as a couch, chair, or human bed, resulting in the ongoing problem of soiled furniture.

Numerous pet beds for cats and small dogs are available on the market in a variety of shapes, many offering removable, washable sleeping covers. A short-fall of these beds is that they lack the anatomical three-dimensional contours of a human lap, making them a poor choice for an animal seeking the security of a surrogate lap when their owner is away.

In particular, cats like to rest on that which is familiar. Another short-fall of many pet beds designed for cats is that the bed itself is not familiar in shape and texture to the cat.

One pet bed (U.S. Pat. No. 5,784,995) has a removable deodorant/insecticide cartridge, but this feature is intended to discourage pests rather than to attract the pet to the bed.

SUMMARY OF THE INVENTION

OBJECTS OF THE INVENTION

It is an object of this invention to provide a pet bed in the shape of a human lap to provide the animal with a familiar environment having the comfort and security of a human lap during times when the owner's lap is unavailable.

A further object is to provide a pet bed which transfers soiling problems from household furniture to the pet bed.

Another object is a pet bed having a removable sleeping surface for easy cleaning which benefits both the pet and the owner.

A yet further object is to provide a pet bed having the three-dimensional contours of a human lap so that shed pet hair tends to become trapped within the center of the bed since the junction of the three-dimensional contour depressions converge near the center.

A yet other object is to provide a pet bed of a pant type material so providing a material texture with which the pet is familiar and thus increasing the likelihood for long term use.

Another and further object is to provide the bed with a replaceable scented pouch to attract the pet to use of the bed.

These and other objects and advantages will be apparent to those skilled in the art in light of the following disclosure, claims and accompanying drawings.

DESCRIPTION OF PREFERRED EMBODIMENT

One embodiment, accordingly, provides a pet bed with cushioning properties for comfort, the three-dimensional contours of a human lap for security, the look and texture that is familiar to the pet, a removable scented pouch to attract the pet to the bed, and an easily removable washable sleeping surface. To this end, a pet bed includes an inner anatomical cushion consisting of a cover that forms the three-dimensional contours of a human lap when stuffed with cushioning material, an outer sleeping surface consistent in look and texture to human shorts that is easily removable for cleaning, and a removable scented pouch.

Figure 1:
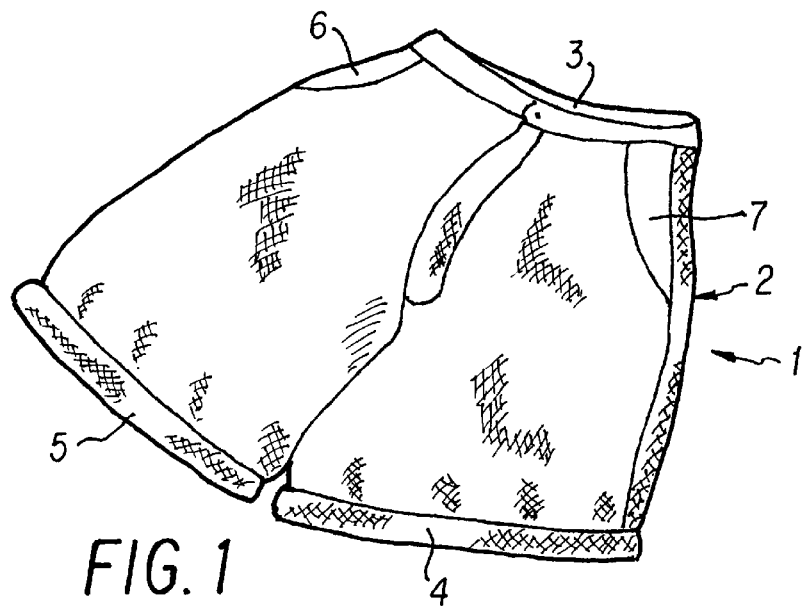
FIG. 1 is a perspective view of a pet bed in accordance with the present invention.
Figure 2:
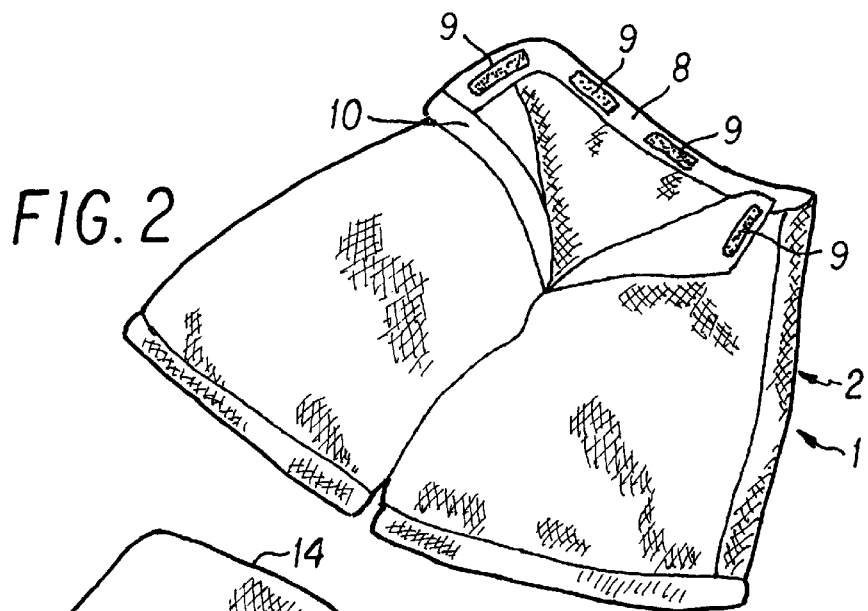
FIG. 2 is a perspective view of the pet bed of FIG. 1 with the waist opening and front fly opening reflected to show the anatomical cushion housed within.
Figure 3:
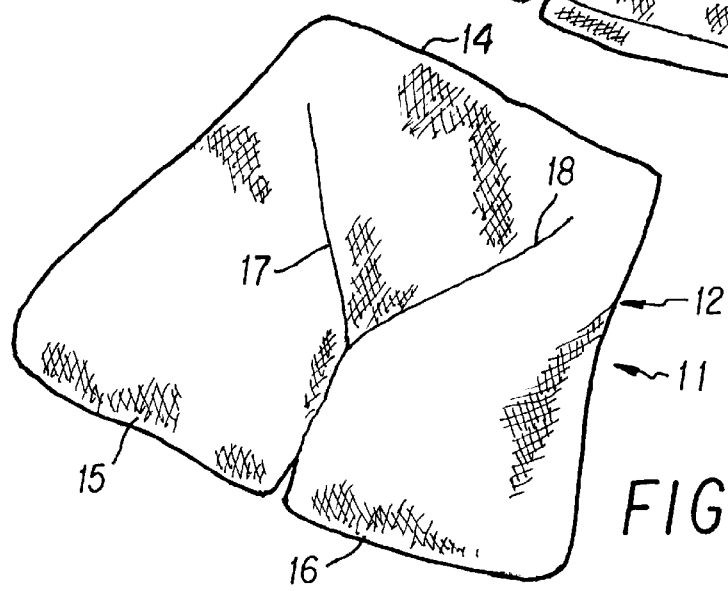
FIG. 3 is a perspective view of the anatomical cushion and its stitched anatomical lines.
Figure 4:
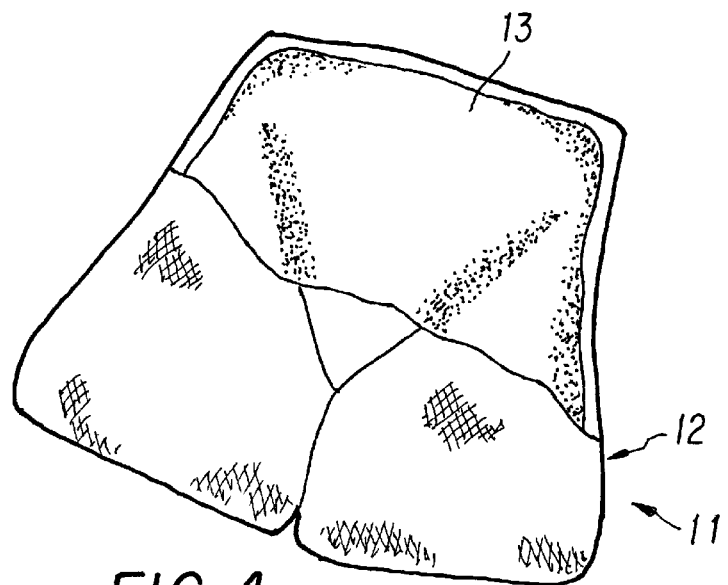
FIG. 4 is a perspective view of the anatomical cushion with a portion of the inner covering cut away to illustrate the cushioning material.
Figure 5:
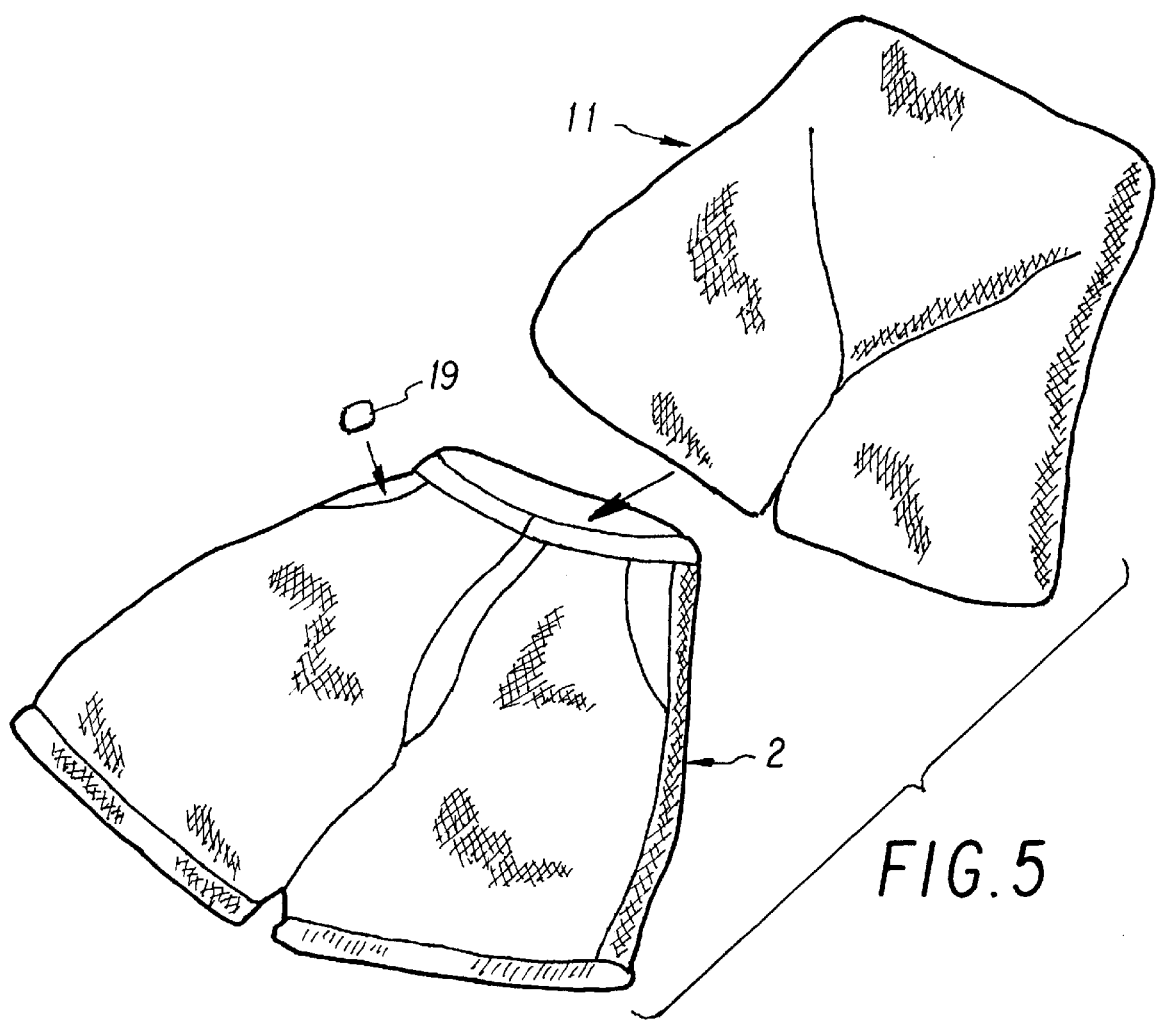
FIG. 5 is an expanded view of the pet bed of FIG. 1.

The invention can best be understood with reference to accompanying drawing FIGS. 1 through 5. The pet bed 1 of the present invention includes an outer covering 2, preferably fabricated from a durable material, such as a fabric that is easily cleaned. Denim type material as is used in jeans meets the needs. The outer covering 2 has a shape consistent with a pair of human shorts, having a waist portion 3, two leg portions 4 and 5, and two front pockets 6 and 7. Savings can be achieved by purchasing actual shorts or shortening human pants to shorts length and using them as outer covering 2. The shorts should be of sufficient size to accommodate a large cat or small dog. The ends of leg portions 4 and 5 are stitched closed. The waist portion 3 has a reclosable access opening 8 held closed by a plurality of fasteners 9, preferably the well-known hook-and-loop fasteners. The top of outer covering 2 has a reclosable fly opening 10 consistent with the fly of a pair of human shorts and held closed with some type of mechanism such as a zipper, snaps, or buttons.

Disposed within outer covering 2 is an anatomical cushion 11 consisting of inner covering 12 made from a durable, but light weight fabric that contains cushioning material 13. Inner covering 12 has a shape consistent with a pair of human shorts, having a waist portion 14 and two leg portions 15 and 16. The waist portion 14 and ends of the two leg portions 15 and 16 are stitched closed containing the cushioning material 13. A key feature is the stitched anatomical lines 17 and 18, stitched in a "V" shaped pattern extending from the crotch diagonally as shown toward, but not reaching each side of the waist portion of inner covering 12. The stitched anatomical lines 17 and 18 create compartments to house the cushioning material 13 such that the anatomical cushion 11 maintains the three-dimensional contours of a human lap even after repetitive use by the pet. Cushioning material 13 consists of a suitable non-allergenic material such as foam pieces polyester, or a mixture of polyester and cotton.

Disposed within front pocket 6 or 7 is a removable scented pouch 19 that consists of a fabric covering of size to easily fit in front pocket 6 or 7, that is stitched closed to contain some type of scented material attractive to the pet, such as catnip in the case of cats.

The features of this invention allow anatomical cushion 11 and removable scented pouch 19 to be easily removed from outer covering 2 so outer covering 2 can be laundered. They also allow easy re-assembly of the pet bed after outer covering 2 has been laundered. Additionally, scented pouch 19 can easily be removed and replaced when the scent diminishes due to age.

What is claimed is:

1. A pet bed comprising an outer covering shaped in the form of human shorts; and a removable anatomical cushion shaped to said shorts and disposed within the outer covering.

2. The bed of claim 1 wherein the outer covering includes a pocket to accommodate a removable, scented pouch.

3. A pet bed of claim 1, wherein the outer covering has the shape and texture of a pair of human shorts and including a waist portion, and two leg portions.

4. The bed of claim 1 also including two front pockets, a recloseable access opening along the waist portion, and a recloseable top fly opening.

5. The bed of claim 3 also including two front pockets, a recloseable access opening along the waist portion, and a recloseable top fly opening.

6. A pet bed of claim 4, wherein the reclosable access opening along the waist portion further includes a plurality of fasteners.

7. A pet bed of claim 5, wherein the recloseable access opening along the waist portion further includes a plurality of fasteners.

8. A pet bed of claim 1, where in the removeable cushion consists of an inner covering having the shape of a pair of human shorts.

9. A pet bed of claim 1 wherein the inner covering has stitched anatomical lines extending in a "V" shape extending from the crotch toward, but not reaching each side of the waist portion.

* * * * *